UNITED STATES PATENT OFFICE.

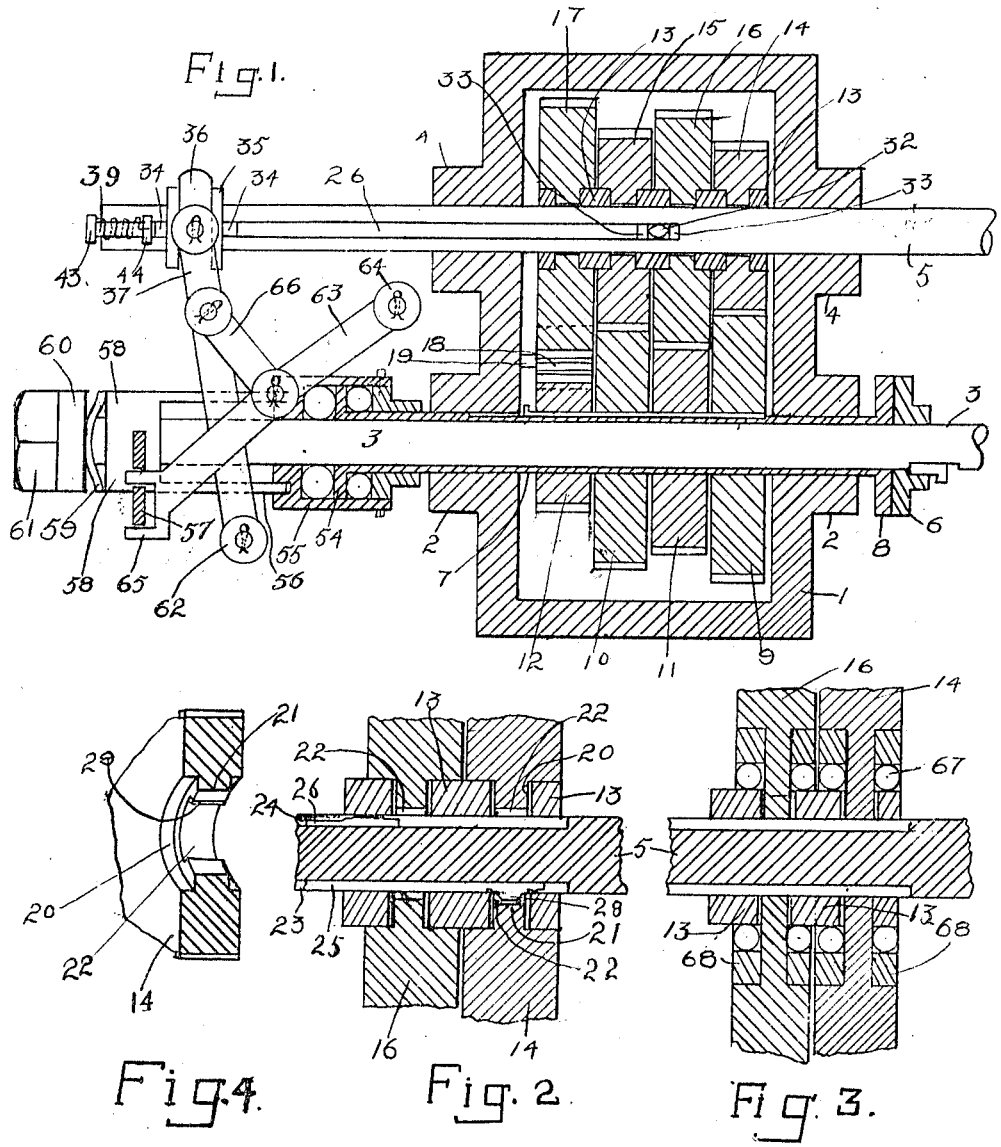

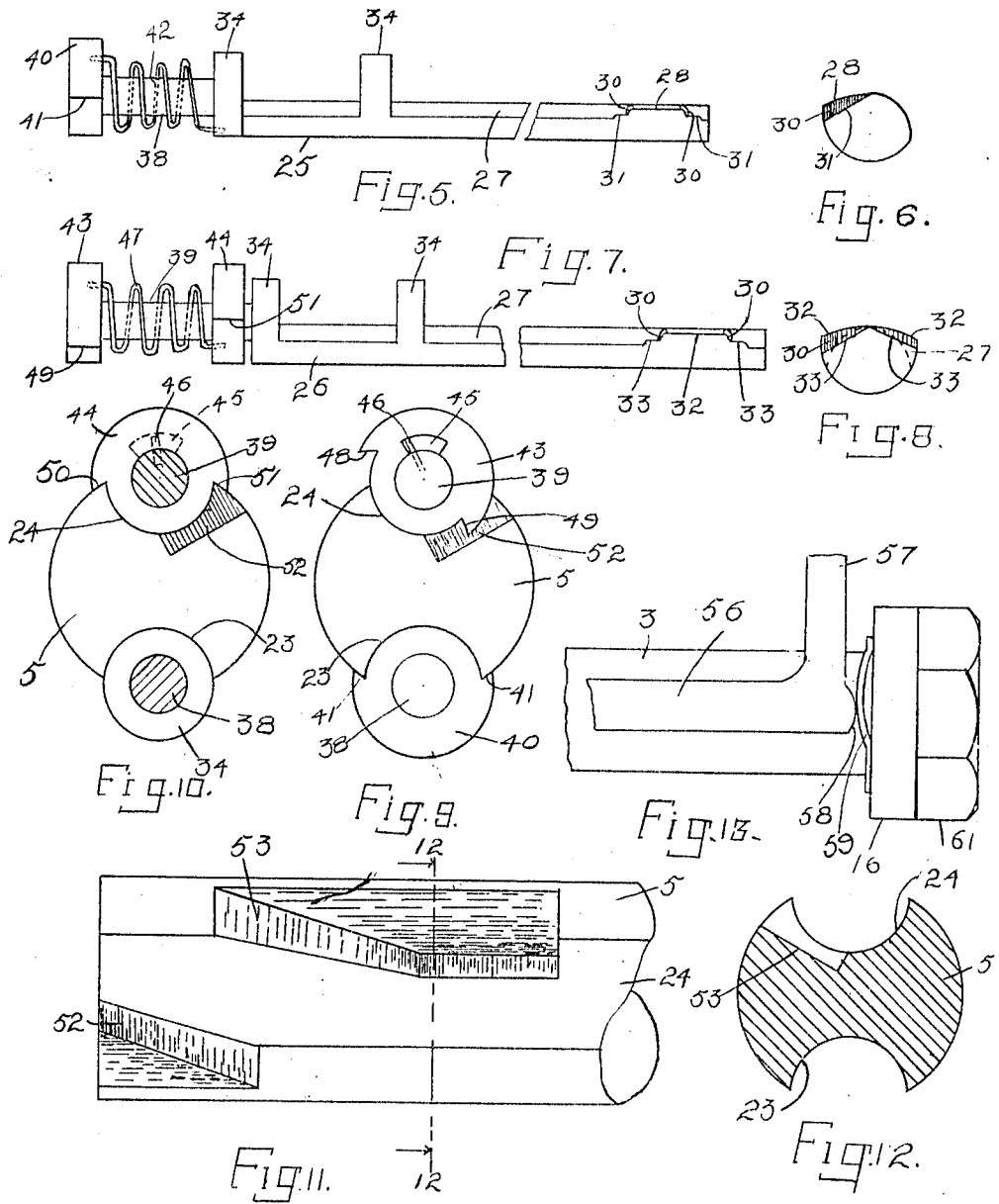

LEON J. CAMPBELL, OF CHICAGO, ILLINOIS.

SPEED-TRANSMISSION MECHANISM.

1,035,152.  Specification of Letters Patent.  Patented Aug. 13, 1912.

Application filed January 23, 1911. Serial No. 604,060.

*To all whom it may concern:*

Be it known that I, LEON J. CAMPBELL, a citizen of the United States, and a resident of Chicago, in the county of Cook and State of Illinois, have invented a new and useful Improvement in Speed-Transmission Mechanism, of which the following is a complete specification.

The main objects of this invention are to provide an improved speed transmission mechanism which is capable of being adjusted very quickly and easily from one speed to another; to provide an improved speed transmission mechanism which is so constructed that the wear on the transmission gears is practically eliminated; to provide improved mechanism for locking the transmission gears to the transmission shaft; to provide improved means for shifting the locking mechanism for the transmission gears; and to provide a speed transmission mechanism in which the drive gears are adapted to run idle when the locking mechanism for the transmission gears is being shifted.

A specific construction embodied in said invention is illustrated in the accompanying drawings, in which:

Figure 1 is a horizontal section of a speed transmission mechanism embodied in this invention. Fig. 2 is a horizontal section of part of the transmission gears showing one form of bearing for the gears on the transmission shaft. Fig. 3 is a view similar to Fig. 2, but showing a slightly modified form of bearings for the transmission gears. Fig. 4 is a fragmentary, perspective view of one of the transmission gears. Fig. 5 is a fragmentary side elevation of one of the locking keys. Fig. 6 is an end elevation of the locking end of said key. Fig. 7 is a side elevation of the other locking key. Fig. 8 is an end elevation of the locking end of the key shown in Fig. 7. Fig. 9 is an end elevation of the transmission shaft and the locking keys. Fig. 10 is an end elevation of the transmission shaft with the locking keys shown in section through their spindles. Fig. 11 is a fragmentary plan view of the key operating end of the transmission shaft. Fig. 12 is a section taken on line 12—12 of Fig. 11. Fig. 13 is a fragmentary side elevation of the drive shaft and the operating lever and fork.

In the construction shown, the gear casing 1 is provided with bearings 2 for the drive shaft 3, and with bearings 4 for the transmission shaft 5, which is parallel to the drive shaft. Rigidly secured on the drive shaft, at one side of the casing 1, is a friction disk 6, and journaled on said shaft and extending through the bearings 2 is a sleeve 7, which is provided on its end adjacent to the disk 6 with a friction disk 8, which together with the disk 6 forms a clutch adapted to lock the drive gears to the drive shaft. Rigidly secured on the sleeve 7, within the casing 1, are the drive gears 9, 10, 11 and 12, which decrease in size in the order named. Rigidly secured on the transmission shaft 5, within the casing 1, are the bearing collars 13 which are constructed of hard metal and are spaced a distance apart. The transmission gears 14, 15, 16, and 17 increase in size in the order named and are mounted on said collars. The gears 14, 15 and 16 mesh respectively with the drive gears 9, 10, and 11, and the reverse gear 17 meshes with an idler pinion 18 which is journaled on a bearing 19 on the casing and meshes with the drive gear 12. The transmission gears are provided in their sides with recesses 20 to receive the bearing collars 13, thereby leaving a central portion 21 which extends between the bearing collars but does not contact with the shaft. In each of the central portions 21 is a locking recess 22 which extends partially around the shaft.

The shaft 5 is provided with oppositely disposed, longitudinally extending key seats 23 and 24, in which are slidably and rockably mounted the locking keys 25 and 26. The inner surface of said keys is formed on the same circle as the key seats, and the outer surface of the body 27 of the key is formed on a smaller curvature than that of the shaft, so that the edges of the body of the key will not be rocked out of the seat in any position of the key. The key 25, which locks the gears 14 and 16 to the shaft 5, need only rock in one direction to lock said gears. Said key is provided near its inner end with a locking lug 28 which is adapted, when the key is in locking position, to extend up into the recess 22 of the gear to lock the gear to the shaft. At the end of each recess 22 which is directed rearwardly of the direction of travel of the gear is an abutment plate 29 adapted to take the wear of the lug 28 on the gear. The ends 30 of the lug 28 are beveled longitudinally of the key, so that when the key is moved longitudinally of the shaft from locking to release position said beveled ends will bear against the edges of the collars 13 and rotate the key to bring the lug out of the recess 22. At each end of the lug 28 is a shoulder 31 which is of less height than the lug but of greater height than the edge of the body 27. The shoulders 31 are adapted to bear on the inner sides of the bearing collars 13 when the lug is in locking position and prevent the lug from becoming wedged in the recess 22. The key 26 rocks in one direction to lock the gear 15 to the shaft 5 and in the opposite direction to lock the gear 17 to the shaft. It is therefore provided with a locking lug 32 on each side, at the ends of which are shoulders 33 similar to the shoulders 31.

For the purpose of shifting the keys 25 and 26 longitudinally of the shaft to bring the locking lugs into register with the various transmission gears, they are each provided near their outer ends with lugs 34 between which is loosely mounted a grooved collar 35, in which is a fork 36, and pivoted to the fork is a lever 37 which is adapted to move the keys longitudinally. At the outer ends of the keys 25 and 26 are the spindles 38 and 39 respectively, and loosely mounted on the end of the spindle 38 is a tension collar 40. The side of the collar 40 which is adjacent to the shaft 5 is of a size to seat in the key seat 23, and the other side is of a larger size, thereby providing shoulders 41 which bear on the shaft at the sides of the key seat, as shown in Fig. 9. A coiled spring 42 is secured at one end to the collar 40 and at the other end to the outer lug 34. The spring 42 is so mounted on the spindle 38 that when the key is in its seat and the shoulders 41 of the collar 40 are resting on the shaft 5 at the sides of the key seat 23, the spring will tend to rotate the key in the direction to turn the lug 28 into locking position.

On the spindle 39 of the key 26 are loosely mounted the tension collars 43 and 44, the former of which is at the outer end of the spindle, and the latter at the inner end adjacent to the outer lug 34. Each of said tension collars 43 and 44 is provided in one side with a recess 45, and pins 46 are carried on the spindle and extend into said recesses and limit the rotative movement of the collars on the spindle. A coiled spring 47 is mounted on the spindle 39 and is secured at its ends to the collars 43 and 44. The collar 43 is provided with oppositely disposed shoulders 48 and 49 which are adapted to bear on the shaft at the sides of the key seat 24, and the collar 44 is provided with similar shoulders 50 and 51.

An inclined cam surface 52 is formed in the shaft 5 at one side of the key seat 24 and extends from the outer end of the seat longitudinally of the shaft and emerges from the shaft at a short distance from the end of the shaft. At the side of the key seat 24 opposite from the cam surface 52 is a cam surface 53 which begins at its outer end a distance from the end of the shaft 5 and extends at an incline into the shaft to a point slightly beneath the bottom of the seat.

When the keys are at their outer limit of movement on the shaft 5 one of the locking lugs 32 of the key 26 is tilted up into the locking recess 22 of the reverse gear 17. In that position the shoulder 50 of the tension collar 44 rests on the side of the key seat 24 in position to enter the cam surface 53, while the collar 43 is thrown over to the right by the tension of the spring, as shown in Fig. 9, with the left side of the recess 45 engaging the pin 46 and tending to rock the key into locking position. When the keys are moved inwardly on the shaft 5 the shoulder 49 contacts the cam surface 52 and tends to rotate the collar 43 to the left. When the shoulder 50 has traveled part way down the incline 53 the tension of the spring has relaxed and become neutral and the pins 46 are both about the center of the recesses 45. Further inward movement of the keys brings the shoulder 49 to the top of the incline 52, and the shoulder 50 to the bottom of the incline 53 where the tension of the spring is reversed and acts to rotate the key 26 in the opposite direction to move the lug 32 into the locking recess 22 of the gear 15.

For the purpose of releasing the friction clutch and thereby disconnecting the drive gears from the drive shaft when the speeds are being changed, the sleeve 7 is provided at its end opposite from the clutch with a flange 54, and non-rotatively mounted on the shaft 3 and inclosing said flange is an anti-friction coupling 55. A fork 56 has its arms connected at their inner ends to said coupling, and are connected together at their outer ends by an operating lever 57 which extends upwardly from the shaft. At the rear end of each arm is a heel 58 which, when the lever is down, is adapted to bear against a strong spring 59 which is carried on a collar or washer 60, which is held in adjusted position by means of a nut 61. When the lever is raised to bring the heel out of contact with the spring 59 the clutch member 8 will release its grip on the clutch member 6, and when the lever is at the lower limit of its movement the spring 59 forces the clutch members together.

The lever 37 is pivoted at one end at 62 to any desired support, and a forked lever 63 is pivoted at one end 64 to a suitable support at a point intermediate the shafts 3 and 5 near the casing 1, and its forked end 65 straddles the lever 57. A connecting link 66 is pivoted at its ends to the levers 37 and 63 at points intermediate the shafts.

If preferred ball bearings 67 may be mounted between the bearing collars 13 and the transmission gears, as shown in Fig. 3, in which case the gears are provided with suitable ball races 68.

The operation of the construction shown is as follows: When it is desired to change the speeds the upper end of the lever 57 is thrown toward the casing 1, thereby raising the heel 58 out of contact with the spring 59 and disconnecting the clutch. The lever 57 is then moved laterally of the shaft and causes the lever 63 to swing the lever 37 and move the collar 35 longitudinally of the shaft 5, thereby shifting the keys to lock the desired transmission gear to the shaft 5. As the keys move and bring their lugs to the locking recess 22, the spring on the spindle of the proper key snaps the lug up into the recess, as before described.

While I have shown and described but one specific embodiment of my invention, it will be understood that various details of the construction shown may be varied or omitted without departing from the scope of the claims.

I claim:

1. A speed transmission mechanism, comprising a drive shaft and a transmission shaft, intermeshing gears loosely mounted on said shafts, a clutch for collectively locking the drive gears to the drive shaft, means for individually locking the transmission gears to the transmission shaft, and mechanism adapted to release the drive gears from the drive shaft when the locking mechanism for the transmission gears is being shifted.

2. A speed transmission mechanism, comprising a drive shaft and a transmission shaft, drive gears loosely mounted on the drive shaft, transmission gears loosely mounted on the transmission shaft and meshing with the drive gears, means adapted to collectively lock the drive gears to the drive shaft, rockable keys adapted to selectively lock the transmission gears to the transmission shaft, and mechanism connecting the locking means for the drive gears with said keys and adapted to release the drive gears when the keys are being shifted.

3. A speed transmission mechanism, comprising a drive shaft and a transmission shaft, intermeshing drive and transmission gears loosely mounted on said shafts, means adapted to collectively lock the drive gears to the drive shaft, longitudinally movable, rockable keys adapted to selectively lock the transmission gears to the transmission shaft, and means connecting said keys with the locking mechanism for the drive gears, and adapted when the drive gears are released to shift said keys.

4. A speed transmission mechanism, comprising a drive shaft and a transmission shaft, intermeshing gears on said shafts, a friction clutch adapted to lock the drive gears to the drive shaft, longitudinally movable keys on the transmission shaft, having lugs thereon adapted to lock the transmission gears to the transmission shaft, and mechanism connecting said keys and said clutch and adapted to release the clutch and shift said keys.

5. A speed transmission mechanism, comprising a drive shaft, a transmission shaft, a sleeve on the drive shaft, a friction clutch adapted to lock the sleeve to the drive shaft, drive gears rigidly secured on said sleeve, coöperating means on the sleeve and drive shaft adapted to operate the clutch, transmission gears loosely mounted on the transmission shaft, and meshing with the drive gears, means on the transmission shaft adapted to lock the transmission gears to said shaft, and operating levers connecting said means with the operating means for the clutch.

6. A speed transmission mechanism, comprising a drive shaft, a sleeve on said shaft, a friction clutch adapted to lock the sleeve to the shaft, a plurality of drive gears rigidly secured to the sleeve, a coupling on one end of the sleeve, a fork connected to said coupling, means on the shaft adapted to engage said fork and operate the clutch, transmission gears on the transmission shaft, and means operated by said fork adapted to lock the transmission gears to the transmission shaft.

7. A speed transmission mechanism, comprising a drive shaft, a transmission shaft, a plurality of drive gears loosely mounted on the drive shaft, a clutch adapted to lock said gears to the shaft, transmission gears on the transmission shaft each having a locking recess therein, locking keys slidably and rockably mounted on the transmission shaft, and having locking lugs adapted to engage in said recesses when brought into register therewith, a collar slidably mounted on the transmission shaft and engaging said keys, means adapted to operate said clutch, and levers connecting said means with said collar and adapted to operate the keys.

8. A speed transmission mechanism, comprising a transmission shaft having keyways therein, bearing collars rigidly secured on said shaft, transmission gears journaled on said collars and having locking recesses therein, keys in said keyways, each key having a locking lug adapted to engage in said recesses, and shoulders at the ends of the lugs adapted to bear against said collars when the keys are in locking position, tension collars on said keys, springs on said tension collars adapted to rotate the keys and throw the lugs into the locking recesses, a drive shaft, drive gears thereon in mesh with the transmission gears, and means mounted on the drive shaft and transmission shaft adapted to operate the keys.

9. A speed transmission mechanism, comprising a drive shaft, a transmission shaft, a plurality of gears loosely mounted on each shaft and intermeshing with those on the other shaft, keys adapted to selectively lock the transmission gears to the transmission shaft, means adapted to collectively lock the drive gears to the drive shaft, and mechanism connecting said means with said keys adapted to operate the keys.

10. A speed transmission mechanism, comprising a transmission shaft, bearing collars rigidly secured on said shaft, transmission gears journaled on said collars, means for selectively locking said gears to the shaft, and means for operating said gears.

11. A speed transmission mechanism, comprising a transmission shaft, a plurality of transmission gears loosely mounted on said shaft, a drive shaft, a sleeve loosely mounted on the drive shaft, a plurality of drive gears rigidly secured on said sleeve in mesh with the transmission gears, coacting means on the sleeve and drive shaft adapted to lock the sleeve to the shaft, and mechanism connected with said sleeve adapted to selectively lock the transmission gears to the transmission shaft.

In witness whereof I have hereunto subscribed my name in the presence of two witnesses.

LEON J. CAMPBELL.

Witnesses:
MATIE WITHENBURY,
W. W. WITHENBURY.